United States Patent
Takehara

(10) Patent No.: US 8,539,306 B2
(45) Date of Patent: Sep. 17, 2013

(54) DATA PROCESSING CIRCUIT AND DATA PROCESSING METHOD

(75) Inventor: Masaru Takehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 13/150,343

(22) Filed: Jun. 1, 2011

(65) Prior Publication Data

US 2011/0320907 A1 Dec. 29, 2011

(30) Foreign Application Priority Data

Jun. 24, 2010 (JP) ................................. 2010-144292

(51) Int. Cl.
*H03M 13/05* (2006.01)
*H03M 13/27* (2006.01)

(52) U.S. Cl.
USPC .......................................... 714/758; 714/764

(58) Field of Classification Search
None
See application file for complete search history.

(56) References Cited

U.S. PATENT DOCUMENTS

| 6,662,332 | B1 * | 12/2003 | Kimmitt ........................ 714/762 |
| 2001/0043615 | A1 * | 11/2001 | Park et al. ..................... 370/474 |
| 2007/0058451 | A1 * | 3/2007 | Uchida .................... 365/189.05 |
| 2007/0079218 | A1 * | 4/2007 | Nagai et al. ................... 714/763 |

FOREIGN PATENT DOCUMENTS

| JP | 48-63644 A | 9/1973 |
| JP | 56-129952 A | 10/1981 |

\* cited by examiner

*Primary Examiner* — Ajay Bhatia
*Assistant Examiner* — Dipakkumar Gandhi
(74) *Attorney, Agent, or Firm* — Fujitsu Patent Center

(57) ABSTRACT

A data processing circuit includes a receive circuit that receives data including a control bit for controlling a process of the data, a hold circuit that holds the received data, an error detection circuit that detects an error in the received data, a first correction circuit that corrects the received data when an error of the control bit in the received data is detected, and outputs the corrected data, and an output select circuit that outputs data held in the hold circuit when no error is detected in the control bit, and outputs the corrected data outputted from the first correction circuit when an error is detected in the control bit.

9 Claims, 8 Drawing Sheets

US 8,539,306 B2

DATA PROCESSING CIRCUIT AND DATA PROCESSING METHOD

CROSS-REFERENCE TO RELATED APPLICATION

This application is based upon and claims the benefit of priority of the prior Japanese Patent Application No. 2010-144292 filed on Jun. 24, 2010, the entire contents of which are incorporated herein by reference.

FIELD

The embodiment discussed herein is related to a data processing circuit and a data processing method.

BACKGROUND

In an information processing device, it is known to detect an error in data which is transferred on a bus as an information transfer path using the ECC code. The error in the data is detected, for example, using a data processing circuit. In detection of an error in data, in the case that the number of bits in data from which an error is to be detected is small, the time taken to transmit the data in the data processing circuit is short. As described above, the time taken to be transmit the data in the data processing circuit is short in the case that the number of bits included in the data concerned is small. Therefore, the time taken for processing the data has not been so increased.

However, with the recent increase in throughput of a central processing unit, the number of bits included in data from which an error is to be detected is increased. The configuration of the data processing circuit used is more complicated with increasing the number of bits included in data concerned. For example, in the case that a gate circuit is used in the data processing circuit, the number of bits which are included in data to be simultaneously processed is increased. Therefore, it may be unavoidable to multi-stage the gate circuit (to have a multi-stage structure). Then, the time taken to transmit the data in the data processing circuit is increased with multi-staging the gate circuit.

In addition, with the above mentioned increase in throughput of the central processing unit, the operating frequency of the central processing unit is increased accordingly. The time of one clock cycle is reduced with increasing the operating frequency. The timing at which the data processing circuit transmits data is delayed with reducing the time of one clock cycle. A hold circuit that holds data is installed in the data processing circuit in order to cope with an increase in operating frequency of the central processing unit. Preferably, the hold circuit includes, for example, a flip flop. The holding circuit is configured to adjust timings at which data is detected and the data is transmitted in the data processing circuit. Therefore, the hold circuit may prevent the timing at which the data is transmitted from being delayed.

However, in many cases, any error does not occur in data which is checked using the data processing circuit. The data is checked regardless of the fact that in many cases any error does not occur in the data. Therefore, excessive time is wasted until a result of error detection is obtained using the data processing circuit.

[Patent Document 1] Japanese Laid-open Patent Publication No. 56-129952

[Patent Document 2] Japanese Laid-open Patent Publication No. 48-63644

SUMMARY

According to an aspect of an embodiment, a data processing circuit includes a receive circuit that receives data including a control bit for controlling a process of the data, a hold circuit that holds the received data, an error detection circuit that detects an error in the received data, a first correction circuit that corrects the received data when an error of the control bit in the received data is detected, and outputs the corrected data, and an output select circuit that outputs data held in the hold circuit when no error is detected in the control bit, and outputs the corrected data outputted from the first correction circuit when an error is detected in the control bit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Next, a data processing circuit 21A and a data processing method performed using the data processing circuit 21A according to the technique disclosed herein may be described. Incidentally, the technique disclosed herein is not limited to embodiments which may be described hereinbelow.

The data processing circuit 21A according to an embodiment and the data processing method performed using the data processing circuit 21A may be described with reference to FIG. 1 to FIG. 8.

Figure 1:
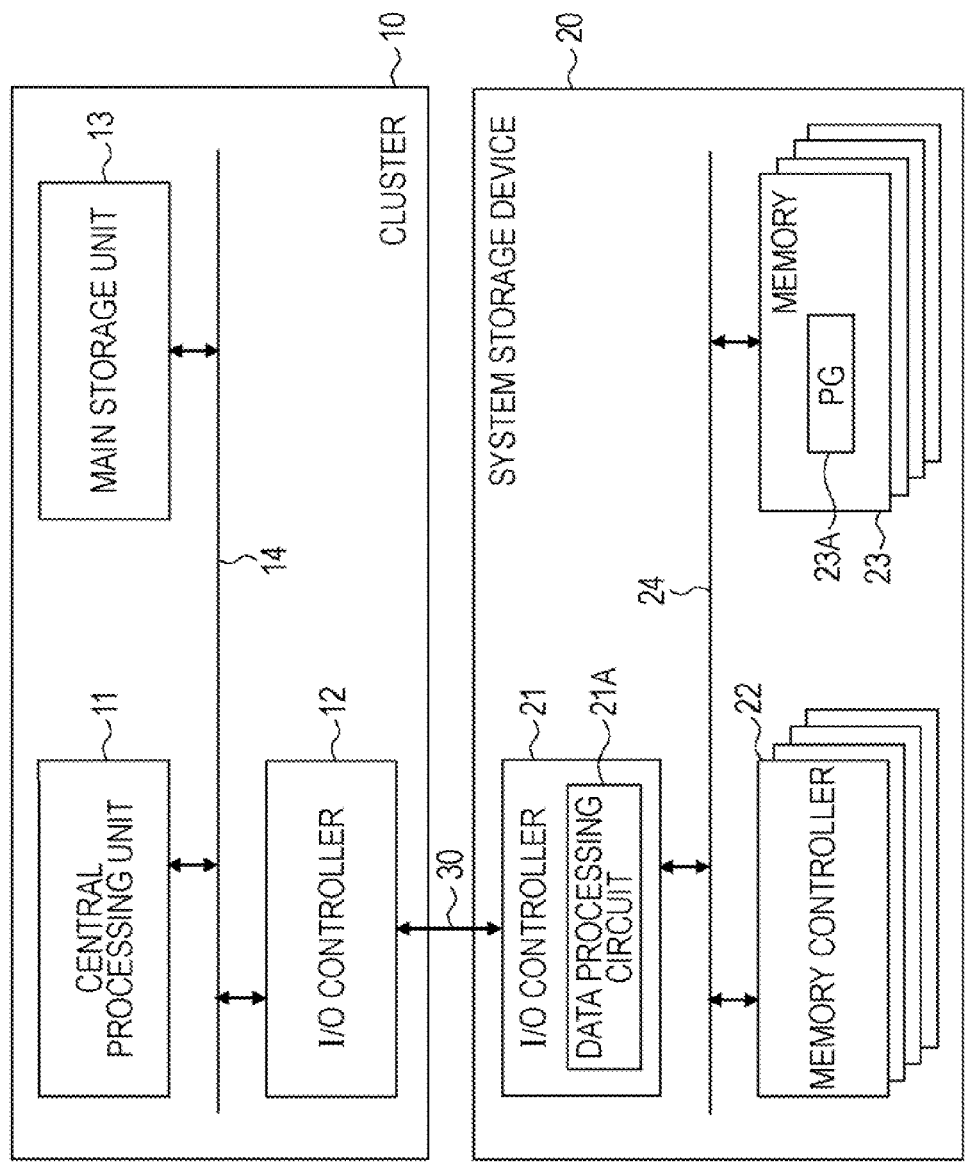
FIG. 1 is a schematic diagram illustrating an example of a configuration of an information processing device according to an embodiment.

FIG. 1 is a schematic diagram illustrating an example of a configuration of an information processing device 1 according to one embodiment. The information processing device 1 includes a cluster 10 and a system storage device 20. The cluster 10 and the system storage device 20 are connected with each other via a connection line 30. For example, an electric line or an optical line may be used as the connection line 30.

The cluster 10 includes a central processing unit 11, an I/O controller 12 and a main storage unit 13. The central processing unit 11, the I/O controller 12 and the main storage unit 13 are connected with one another via a bus 14.

The central processing unit 11 executes an arithmetic operating process involving the cluster 10. The central processing unit 11 controls the operations of the I/O controller 12 and the main storage unit 13.

The I/O controller 12 is installed in order to connect the cluster 10 with the system storage device 20. The I/O controller 12 analyzes a receive packet which has been sent from the system storage device 20. Then, the I/O controller 12 sends the system storage device 20 a response to a command sent from the system storage device 20. The I/O controller 12 transfers data to the system storage device 20. The I/O controller 12 sets the priority order in which it gains access to the commands and data sent from the system storage device 20. The I/O controller 12 packetizes the commands and data received from the system storage device 20. The I/O controller 12 sends the central processing unit 11 the packetized commands and data.

The main storage unit 13 executes reading of data stored therein or writing of data into itself in response to a request from the central processing unit 11.

The system storage device 20 includes an I/O controller 21, a memory controller 22 and a memory 23. The I/O controller 21, the memory controller 22 and the memory 23 are connected with one another via a bus 24.

The I/O controller 21 is installed in order to connect the system storage device 20 with the cluster 10. The I/O controller 21 analyzes a receive packet which has been sent from the cluster 10. Then, the I/O controller 21 sends the cluster 10 a response to a command sent from the cluster 10. The I/O controller 21 transfers data to the cluster 10. The I/O controller 21 sets the priority order in which it gains access to the commands and data sent from the cluster 10. The I/O controller 21 packetizes the commands and data received from the cluster 10. The I/O controller 21 sends the memory controller 22 the packetized commands and data.

In the case that an error has occurred in a bit included in data which has been received from the cluster 10, a data processing circuit 21A performs error processing on the data. Then, the data processing circuit 21A sends the memory controller 22 the data on which the error processing has been performed. In addition, in the case that an error has occurred in a bit included in data which has been received from the memory controller 22, the data processing circuit 21A performs error processing on the data. Then, the data processing circuit 21A sends the cluster 10 the data on which the error processing has been performed.

The memory controller 22 controls accessing from the I/O controller 21 to the memory 23.

The memory 23 temporarily stores, for example, data used in the cluster 10 and a program 23A such as an Operation System (OS) and the like to be executed using the cluster 10. The program 23A is a program executed in order to perform data processing using the information processing device 1. The program 23A is executed using the cluster 10.

Incidentally, the program 23A is stored in "portable physical storage media" such as, for example, a flexible disk (FD), a CD-ROM, an MO disk, a DVD disk, a magnet-optical disk, an IC card and the like which are inserted into the system storage device 20. In addition, the program 23A is stored into disk units installed inside and outside of the system storage device 20. Further, the program 23A is stored into "another computer (or a server)" which is connected with the system storage device 20 over a public circuit, Internet, a LAN, a WAN and the like. The system storage device 20 is allowed to read the program 23A out of one of the above mentioned storage media to be executed.

Figure 2:
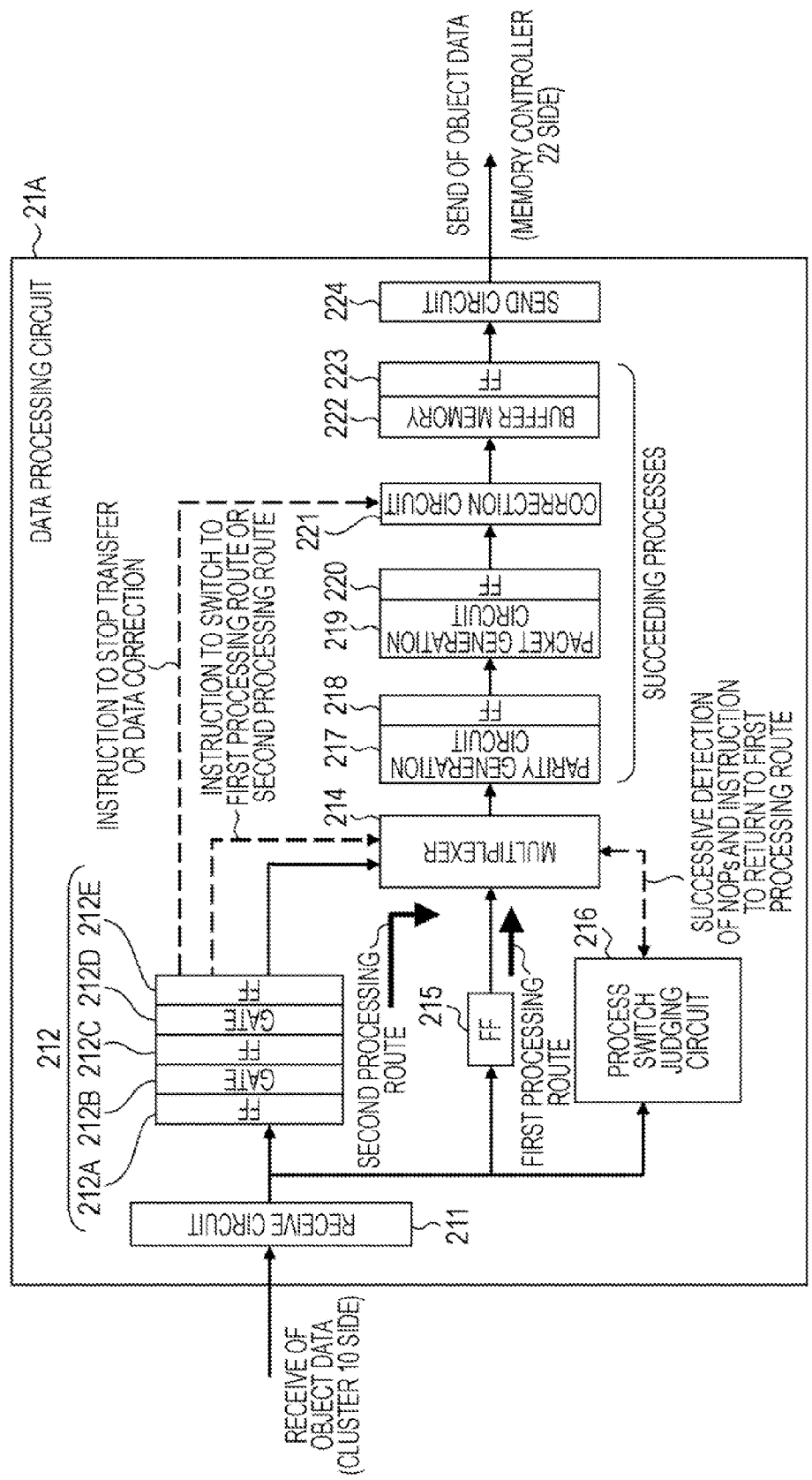
FIG. 2 is a diagram illustrating an example of a configuration of a data processing circuit according to the embodiment.

FIG. 2 is a diagram illustrating an example of a configuration of the data processing circuit 21A according to the embodiment. The data processing circuit 21A includes a data receive circuit 211, an error detection and correction circuit 212, a multiplexer 214 (an output select circuit), a flip-flop 215, a process switch judging circuit 216 (an instruction circuit), a parity generation circuit 217, a flip-flop 218, a packet generation circuit 219, a flip-flop 220, an error correction circuit 221, a buffer memory 222, a flip-flop 223 and a data send circuit 224. The configuration of the flip-flop 215 is the same as those of the flip-flops 218, 220 and 223.

The data processing circuit 21A performs error processing on data which has been received from, for example, the cluster 10 and is to be subjected to error processing. Then, the data processing circuit 21A sends the memory controller 22 the data so subjected to error processing. The data processing circuit 21A may be configured by using, for example, a Large Scale Integrated-circuit (LSI).

Figure 7:
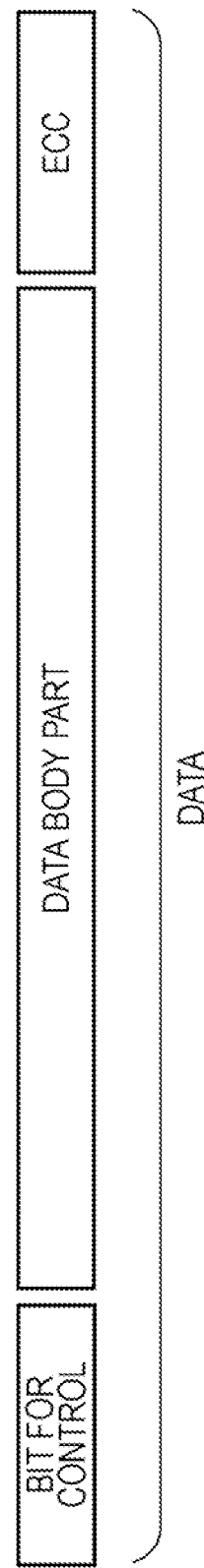
FIG. 7 is a diagram illustrating an example of a configuration of data according to the embodiment.

FIG. 7 is a diagram illustrating an example of a configuration of data according to the embodiment. As illustrated in FIG. 7, the data includes an Error Check and Correction (ECC) code, bits for control, and a data body part. The ECC code is a code used to detect an error in the data. The bits for control are bits including, for example, an Operation Code (OP CODE) or address information. In the case of 131-bit data including a 128-bit data body part, three bits are allocated as the bits for control (or the control bits; hereinafter, referred to as the bit for control for convenience of explanation). The ECC code is an error correction code which has been calculated on the basis of the data body part. The error correction code is used to allow, for example, two-bit error detection and one-bit error correction. Incidentally, in the embodiment, the bit for control is also used to determine the states of succeeding processes. The bits of control are used for controlling a process of the data.

The data receive circuit 211 receives data including a command to transfer data sent from the cluster 10 to the memory controller 22. The data receive circuit 211 sends the error detection and correction circuit 212 and the flip-flop 215 the received data.

The error detection and correction circuit 212 includes pluralities of flip-flops and gate circuits. In the example illustrated in FIG. 2, the error detection and correction circuit 212 is configured by combining a flip-flop 212A, a gate circuit 212B, a flip-flop 212C, a gate circuit 212D and a flip-flop 212E with one another in order. A flip-flop which is the same as the flip-flops 212C and 212E in configuration may be used as the flip-flop 212A.

The flip-flop 212A receives data including a first ECC code which has been output from the data receive circuit 211 from the cluster 10. The flip-flop 212A holds data received from the error detection and correction circuit 212. The flip-flop 212A sends the gate circuit 212B the held data.

Incidentally, for example, the flip-flop 212A receives the data with the first ECC code included which has been sent from the data receive circuit 211. The flip-flop 212A holds the received data for "1τ". The flip-flop 212A then outputs the received data. "1τ" is the time of one clock cycle of the data processing circuit 21A. If the frequency of the data processing circuit 21A is, for example, 500 MHz, the time of one clock cycle may be 2 nanoseconds (ns). The flip-flop 212A is installed in order to adjust timings at which an error is detected and data is transferred in the error detection and correction circuit 212 in tune with one clock cycle of the data processing circuit 21A. Therefore, the flip-flop 212A may prevent a timing at which data is transferred in the data processing circuit 21A from being delayed.

The gate circuit 212B is installed in order to generate a second ECC code used for checking for an error in data. For example, the data to be processed using the data processing circuit 21A includes 128 bits. Then, the gate circuit 212B may be configured by combining six stages of two-input Exclusive OR (XOR) circuits with one stage of a NOT circuit. The gate circuit 212B generates, for example, the second ECC code of nine bits. The gate circuit 212B sends the flip-flop 212C the second ECC code together with the data including the first ECC code.

The flip-flop 212C receives the data with the first ECC code included and the second ECC code which has been generated using the gate circuit 212B from the gate circuit 212B. The flip-flop 212C temporarily holds the received data with the first ECC code included and the received second ECC code which has been generated using the gate circuit 212B. The flip-flop 212C is installed in order to adjust a timing at which the data is transferred in the error detection and correction circuit 212. The flip-flop 212C sends the gate circuit 212D the data with the first ECC code included and the second ECC code which are held therein.

The gate circuit 212D receives the data with the first ECC code included and the second ECC code from the flip-flop 212C. The gate circuit 212D decodes bits used for data correction from the first ECC code and the second ECC code. The first ECC code has been received from the data receive circuit 211 so as to generate data used for error correction. The second ECC has been generated using the gate circuit 212B. The gate circuit 212D sends the flip-flop 212E data which has been corrected in accordance with a result obtained by exclusive-ORing (XORing) the generated data used for error correction. Moreover, the gate circuit 212D sends the data which has been sent from the data receive circuit 211 in an error-not-corrected state.

An error bit which may be checked when an error is to be detected from data, that is, a bit in which an error has occurred is detected by comparing the first ECC code with the second ECC code. The gate circuit 212D of the error detection and correction circuit 212 are used for comparing the first ECC code with the second ECC code. In addition, the gate circuit 212D determines whether an error bit has occurred in the bit for control or in the data body part. Whether the error bit is present in the bit for control or in the data body part is determined by making the gate circuit 212D recognize the position at which the bit for control is present in the data. The position of the error bit is identified, for example, by checking logics of the ECC codes.

As a result of comparison of the first ECC data with the second ECC data using the gate circuit 212D, for instance, an error of two or more bits has been detected from the data which has been output from the data receive circuit 211. Then, the error detection and correction circuit 212 instructs, for example, the data receive circuit 211 to transfer again data from the cluster 10.

As a result of comparison of the first ECC data with the second ECC data using the gate circuit 212D, for instance, a one-bit error has been detected from the data which has been output from the data receive circuit 211. Then, a circuit which is included as a part of the error detection and correction circuit 212 corrects the detected one-bit error in the data.

In the case that the one-bit error which has been detected using the gate circuit 212D is present in the bit for control, the error detection and correction circuit 212 corrects the bit for control. The gate circuit 212D sends the multiplexer 214 the data the bit for control in which has been corrected.

The flip-flop 212E receives the data which has been error-corrected using the gate circuit 212D. The flip-flop 212E holds the data which has been error-corrected using the gate circuit 212D. The flip-flop 212E then adjusts a timing at which the data is transferred in the error detection and correction circuit 212. The flip-flop 212E sends the multiplexer 214 the held data.

The flip-flop 215 receives the data which has been output from the data receive circuit 211. The flip-flop 215 holds the data which has been received from the error detection and correction circuit 212. The flip-flop 215 adjusts a timing at which the data is transferred to the multiplexer 214. The flip-flop 215 sends the multiplexer 214 the data which has been output from the data receive circuit 211 and is held therein.

Incidentally, a processing route on which data processing is performed via the flip-flop 215 may be referred to as a first processing route. The first processing route is a processing route on which data is input into the multiplexer 214 via the flip-flop 215 with no execution of error detecting and correcting processes using the error detection and correction circuit 212.

On the other hand, a processing route on which data is output to the multiplexer 214 via the error detection and correction circuit 212 may be referred to as a second processing route. The second processing route is a processing route on which data which has been subjected to the error detecting and correcting processes using the error detection and correction circuit 212 is input into the multiplexer 214.

It is assumed that the processing time of the flip-flop 215 is, for example, $1\tau$. Under the above mentioned assumption, the time taken until the data which has been output from the data receive circuit 211 reaches the multiplexer 214 via the flip-flop 215 on the first processing route may be $1\tau$. On the other hand, the flip-flops 212A, 212C and 212E are combined with one another in order. Therefore, the time taken until the data which has been output from the data receive circuit 211 reaches the multiplexer 214 via the error detection and correction circuit 212 on the second processing route may be $3\tau$ in total. On the first processing route, execution of data processing is completed earlier than would be possible on the second processing route by $2\tau$.

For instance, the one-bit error which has been detected using the gate circuit 212D is present in the bit for control. Then, the error detection and correction circuit 212 instructs the multiplexer 214 to select and output the data which has been sent on the second processing route. For instance, the one-bit error which has been corrected using the error detection and correction circuit 212 is present in the bit for control. Then, the error detection and correction circuit 212 instructs the error correction circuit 221 to stop execution of the data processing which is being performed on the first processing route. The execution of the data processing is completed earlier than would be possible on the second processing route by $2\tau$.

For instance, the one-bit error which has been detected using the error detection and correction circuit 212 is present in the data body part. Then, the error detection and correction circuit 212 instructs the multiplexer 214 to select and output data which has been sent on the first processing route. In addition, the error detection and correction circuit 212 instructs the error correction circuit 221 to correct the data which has been on the first processing route.

The process switch judging circuit 216 (instruction circuit) performs a Non Operation (NOP) determining process (a process of determining whether NOPs are detected) on the data sent from the data receive circuit 211. The process switch judging circuit 216 performs the NOP determining process on the data by detecting the bit for control in the data and interpreting the detected bit for control. The process switch judging circuit 216 determines whether NOPs are successively present using a counter (not illustrated).

For instance, it has been determined that the NOPs are successively present in the data which has been sent from the data receive circuit 211 for 2τ or more. Then, the process switch judging circuit 216 instructs the multiplexer 214 to return to the first processing route. The multiplexer 214 performs a switching operation of selecting and outputting the data which has been sent on the first processing route in accordance with the instruction from the process switch judging circuit 216.

The multiplexer 214 receives the data the one-bit error in which has been corrected from the error detection and correction circuit 212. In addition, the multiplexer 214 receives data sent from the flip-flop 215. The multiplexer 214 selects the one-bit-error-corrected data which has been sent from the error detection and correction circuit 212 or the data which has been sent from the flip-flop 215. The multiplexer 214 selects the one-bit-error-corrected data or the data in accordance with the instructions from the error detection and correction circuit 212 and the process switch judging circuit 216. The multiplexer 214 then outputs the selected data to the parity generation circuit 217.

Figure 8:
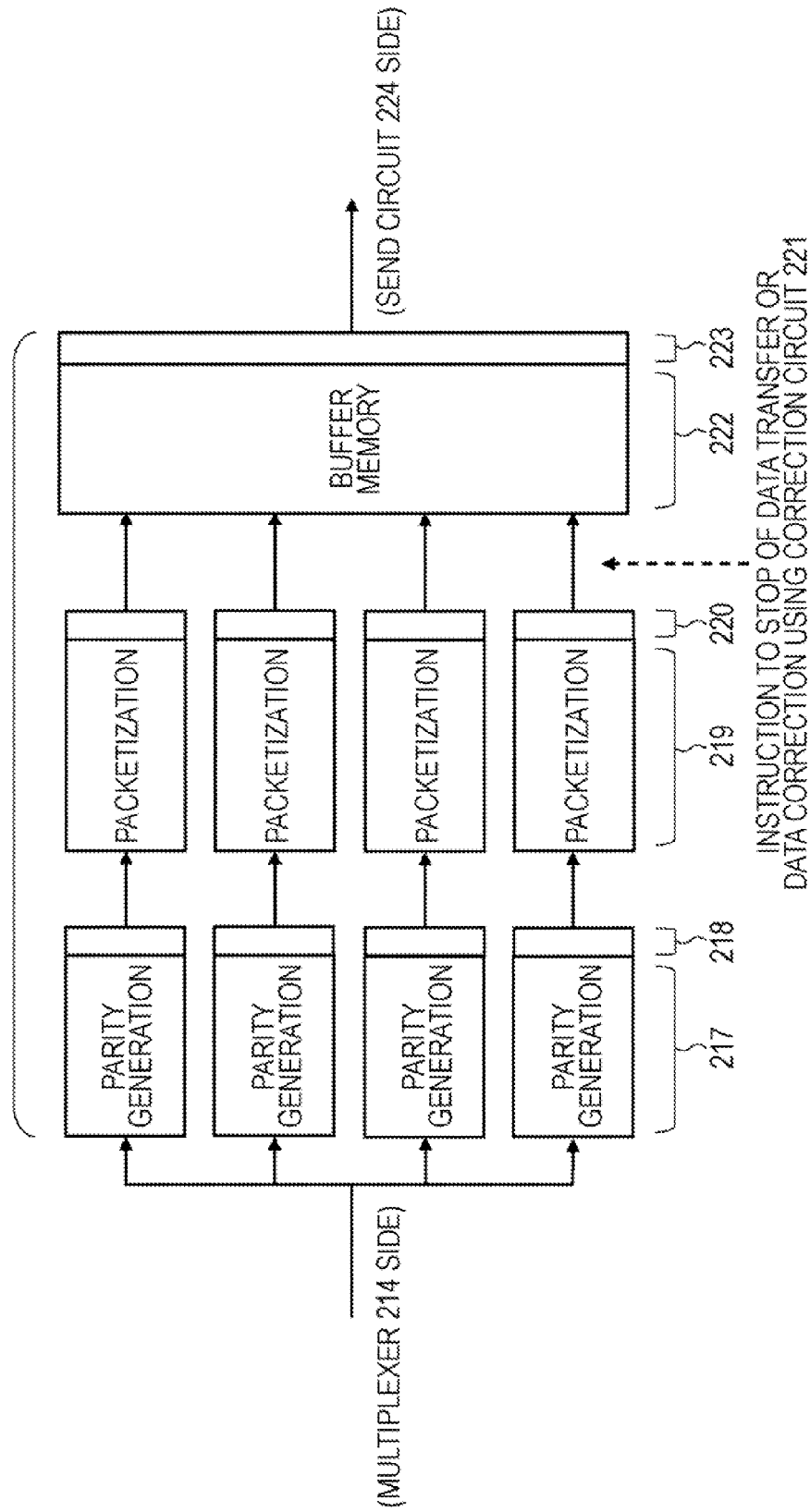
FIG. 8 is a diagram illustrating an example of a state in which data which has been sent from a multiplexer (an output select circuit) is processed using a data processing circuit.

FIG. 8 is a diagram illustrating an example of a state in which data which has been sent from the multiplexer 214 is processed using the data processing circuit 21A.

The parity generation circuit 217 generates a parity bit from the data which has been sent from the multiplexer 214. As illustrated in the example in FIG. 8, the parity generation circuit 217 divides 128-bit data into four pieces of 32-bit data. The parity generation circuit 217 generates a parity bit from each piece of 32-bit data. The parity generation circuit 217 sends the flip-flop 218 data to which the generated parity bits are added.

The flip-flop 218 receives data which has been output from the parity generation circuit 217 as illustrated in FIG. 8. The flip-flop 218 holds the data to which the parity bits which have been generated using the parity generation circuit 217 are added. The flip-flop 218 adjusts a timing at which the data is transferred to the packet generation circuit 219. The flip-flop 218 sends the packet generation circuit 219 the held data.

The packet generation circuit 219 generates a packet from the data with the parity bits added which has been sent from the flip-flop 218 as illustrated in FIG. 8. The packet generation circuit 219 sends the flip-flop 220 the packetized data.

The flip-flop 220 receives the packetized data sent from the packet generation circuit 219 as illustrated in FIG. 8. The flip-flop 220 holds the data sent from the packet generation circuit 219. The flip-flop 220 adjusts a timing at which the data is transferred to the error correction circuit 221. The flip-flop 220 sends the error correction circuit 221 the held data.

The error correction circuit 221 receives the data sent from the flip-flop 220. The error correction circuit 221 corrects the one-bit error which is present in the data body part of the entire data which has been output on the first processing route. The error correction circuit 221 corrects the one-bit error in accordance with the instruction from the error detection and correction circuit 212. The error correction circuit 221 outputs data including the data the bit for control in which has been corrected to the buffer memory 222. On the other hand, an instruction to stop transferring data which has been send on the first processing route has been received from the error detection and correction circuit 212. The error correction circuit 221 then does not output the data which has been send on the first processing route. In addition, the error correction circuit 221 corrects the data which has been output on the first processing route in accordance with an instruction from the error detection and correction circuit 212. Incidentally, the data which has been send on the second processing route is output to the buffer memory 222 without being corrected using the error correction circuit 221.

The buffer memory 222 receives the data which has been sent from the error correction circuit 221 as illustrated in FIG. 8. The buffer memory 222 temporarily writes the received data into it. The buffer memory 222 sends the flip-flop 223 the written data.

The flip-flop 223 receives the data which has been sent from the buffer memory 222 as illustrated in FIG. 8. The flip-flop 223 holds the data which has been sent from the buffer memory 222. The flip-flop 223 adjusts a timing at which the data is transferred to the data send circuit 224. The flip-flop 223 sends the data send circuit 224 the received data.

The data send circuit 224 receives the data which has been sent from the flip-flop 223. The data send circuit 224 sends the memory controller 22 the received data.

Incidentally, a parity generating process, a packet generating process and a data writing process may be generally referred to as "succeeding processes". The parity generating process is executed using the parity generation circuit 217. The packet generating process is executed using the packet generation circuit 219. The data writing process is executed using the buffer memory 222.

Figure 3:
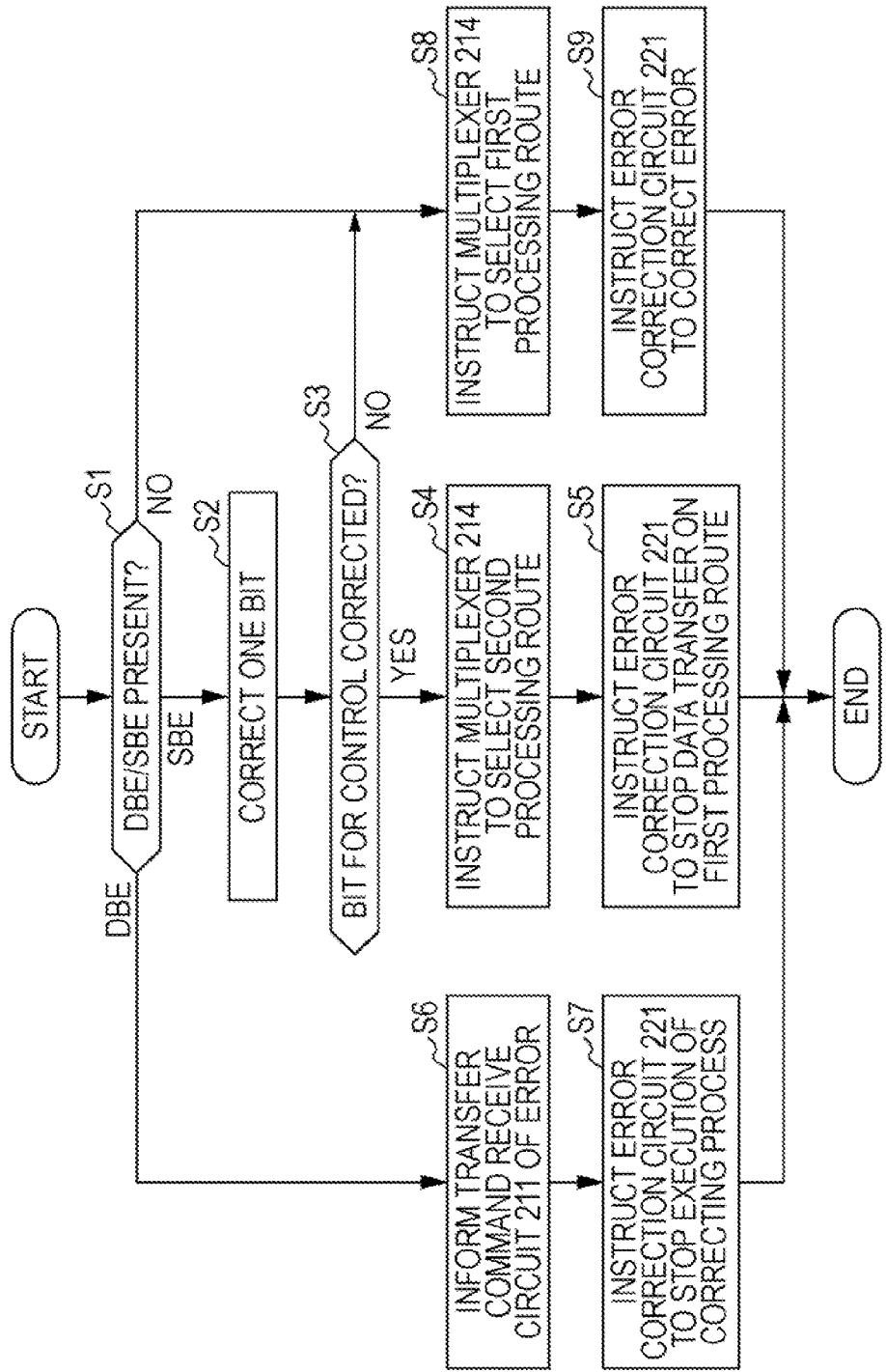
FIG. 3 is a flowchart illustrating an example of an operation of an error detection and correction circuit according to the embodiment.

FIG. 3 is a flowchart illustrating an example of an operation of the error detection and correction circuit 212 according to the embodiment. The processing illustrated in FIG. 3 is error processing which is performed on the data that the data receive circuit 211 has received using the error detection and correction circuit 212.

At S1, the error detection and correction circuit 212 determines whether an error is present in received data. When the error is present in the received data, the error detection and correction circuit 212 determines whether an error of one bit or an error of two or more bits is present in the data. In the case that the error of one bit is present in the data (S1, SBE), the error detection and correction circuit 212 executes the process at S2. Incidentally, an error of one bit is called an SBE (Single Bit Error) and an error of two bits is called a DBE (Double Bit Error).

At S2, the error detection and correction circuit 212 corrects the detected single bit error.

At S3, the error detection and correction circuit 212 determines whether the corrected single bit error is an error that has occurred in the bit for control. In the case that the corrected single bit error is the error that has occurred in the bit for control (S3, Y (Yes)), the error detection and correction circuit 212 executes the process at S4.

At S4, the error detection and correction circuit 212 instructs the multiplexer 214 to output data which has been transferred on the second processing route.

At S5, the error detection and correction circuit 212 instructs the error correction circuit 221 to stop transferring data which has been transferred on the first processing route. In addition, at S5, the error detection and correction circuit 212 instructs the error correction circuit 221 not to correct the data (that data correction is not needed). Incidentally, at S5, the error detection and correction circuit 212 instructs the error correction circuit 221 not to correct the data and to stop transferring the data. The error detection and correction circuit 212 instructs the error correction circuit 221 after the data has passed through two stages of flip-flops, that is, the flip-flops 218 and 220.

In the case that the error of two or more bits is present at S1 (S1, DBE), the process proceeds to S6 and the error detection and correction circuit 212 notifies the data receive circuit 211 of occurrence of the error. Then, the error detection and correction circuit 212 instructs the data receive circuit 211 to send again the data.

At S7, the error detection and correction circuit 212 instructs the error correction circuit 221 to stop execution of a process of correcting the data which has been send on the first processing route.

On the other hand, the error is not present in the data (S1, N (No)) at S1. The process proceeds to S8 and the error detection and correction circuit 212 then instructs the multiplexer 214 to select and output the data which has been send on the first processing route.

At S9, the error detection and correction circuit 212 instructs the error correction circuit 221 to correct the data which has been sent on the first processing route.

Incidentally, when the corrected single bit error is not the error that has occurred in the bit for control at S3, the process also proceeds to S8 and the error detection and correction circuit 212 executes the process at S8.

Figure 4:
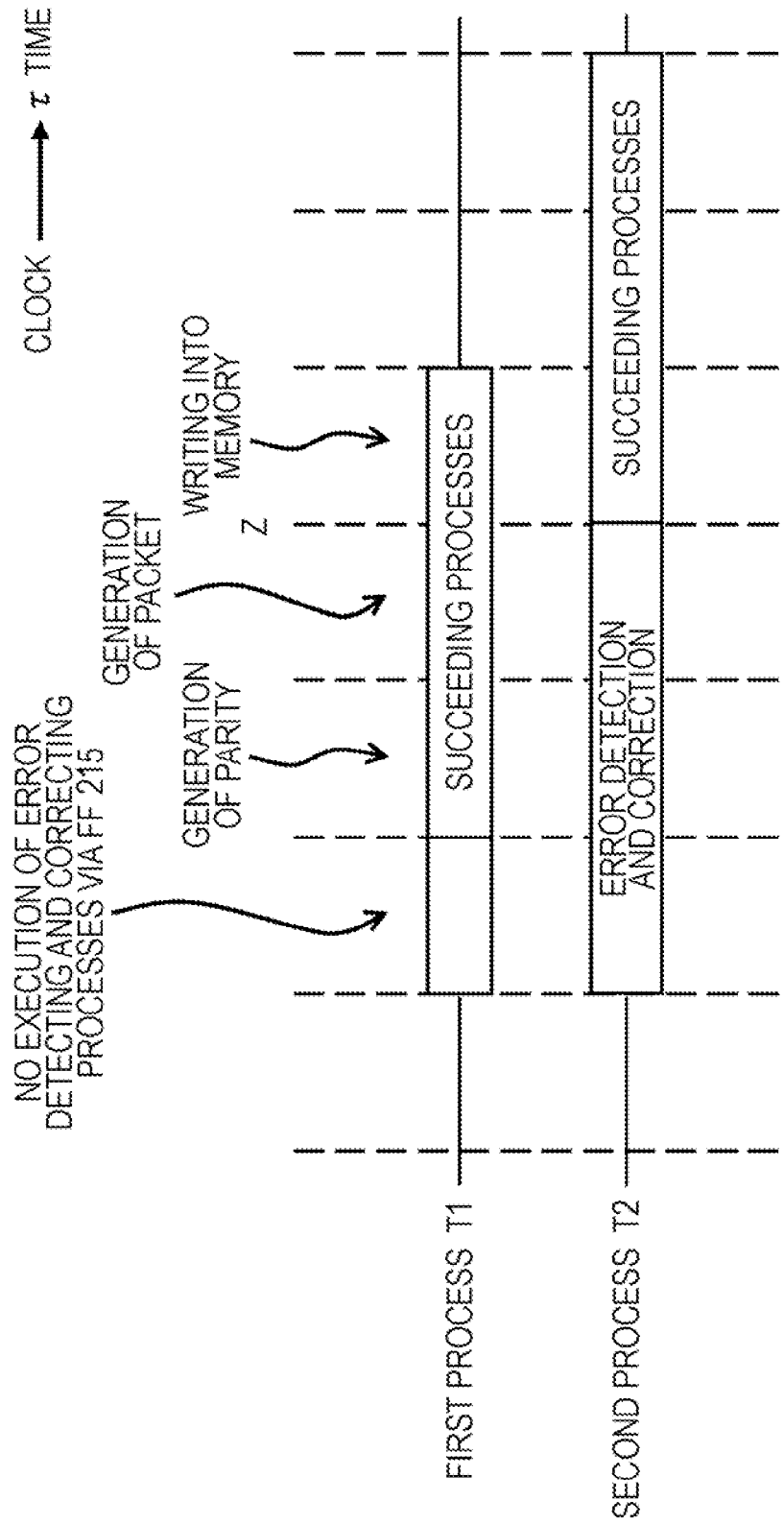
FIG. 4 is a diagram illustrating an example of a timing chart of the data processing circuit according to the embodiment.

FIG. 4 is a timing chart of a first process T1 and a second process T2 executed using the data processing circuit 21A according to the embodiment. In FIG. 4, the horizontal axis indicates a time τ and each scale along the horizontal axis indicates one clock (=1τ) each.

The first process T1 is a process that the succeeding processes are performed on data which has been output from the multiplexer 214 via the flip-flop 215. The first process T1 is a process without being subjected to the error detecting and correcting processes using the error detection and correction circuit 212. In the first process T1, the data which has been output from the data receive circuit 211 is output via the flip-flop 215, the flip-flop 218, the flip-flop 220 and then the flip-flop 223. It is assumed that the data processing time of each of the flip-flops 215, 218, 220 and 223 is 1τ. Since the data passes through four FFs in total on the first processing route, the processing time for execution of the first process T1 may be 4τ in total under the above mentioned assumption.

The second process T2 is a process that the succeeding processes are performed on the data which has been output from the multiplexer 214 after the error detecting and correcting processes have been performed on the data using the error detection and correction circuit 212. In the second process T2, the data which has been outputted from the data receive circuit 211 is sent to the multiplexer 214 in the error detection and correction circuit 212. The data which has been outputted via the flip-flop 212A, the gate circuit 212B, the flip-flop 212C, the gate circuit 212D and the flip-flop 212E in the error detection and correction circuit 212. In the second process T2, the data which has been output from the multiplexer 214 is output via the flip-flop 218, the flip-flop 220 and the flip-flop 223. It is assumed that the data processing time of each of the flip-flops 212A, 212C and 212E is 1τ which is the same as the processing time of each of the flip-flops 218, 220 and 223. Since the data passes through six FFs in total on the second processing route, the processing time for execution of the second process T2 may be 6τ in total under the above mentioned assumption. Comparing the processing times for execution of the first process T1 and the second process T2 with each other, it is found that there is a difference of 2τ between them. In the first process T1, execution of data processing is completed earlier than would be possible in the second process T2 by 2τ.

It is assumed that the error detection and correction circuit 212 instructs to stop execution of the first process T1 and to instruct to switch the process to be executed from the first process T1 to the second process T2 at a time Z (as the timing). The time Z is 2τ after start of execution of the succeeding processes in the first process T1. The time Z is a time at which execution of the error detecting and correcting processes using the error detection and correction circuit 212 in the second process T2 is completed in time before execution of a process of writing data into the buffer memory is completed in the first process T1 execution. The first process T1 execution has been started simultaneously with start of execution of the second process T2. For instance, the single bit error has been detected in the bit for control in the second process T2. The multiplexer 214 then selects and outputs the data which has been processed in the second process T2 in accordance with the instruction from the error detection and correction circuit 212. Then, the error correction circuit 221 stops execution of data processing in the first process T1 at the time Z in accordance with the instruction from the error detection and correction circuit 212. As a result, it is allowed to write data in which the single bit errors in the bit for control and the data body part have been corrected in the second process T2 into the buffer memory 222.

Figure 5:
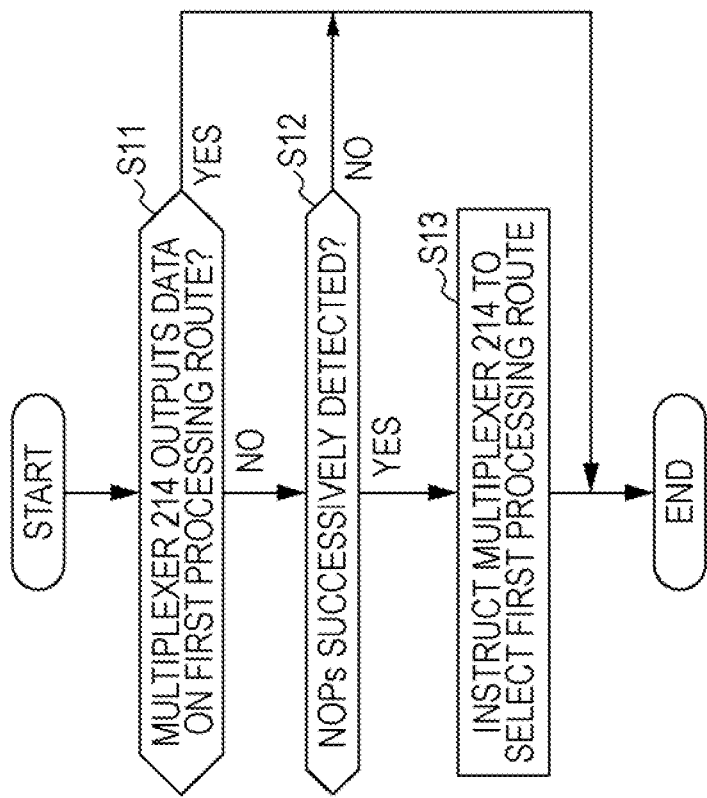
FIG. 5 is a flowchart illustrating an example of an operation of a process switch judging circuit (an instruction circuit) according to the embodiment.
Figure 6:
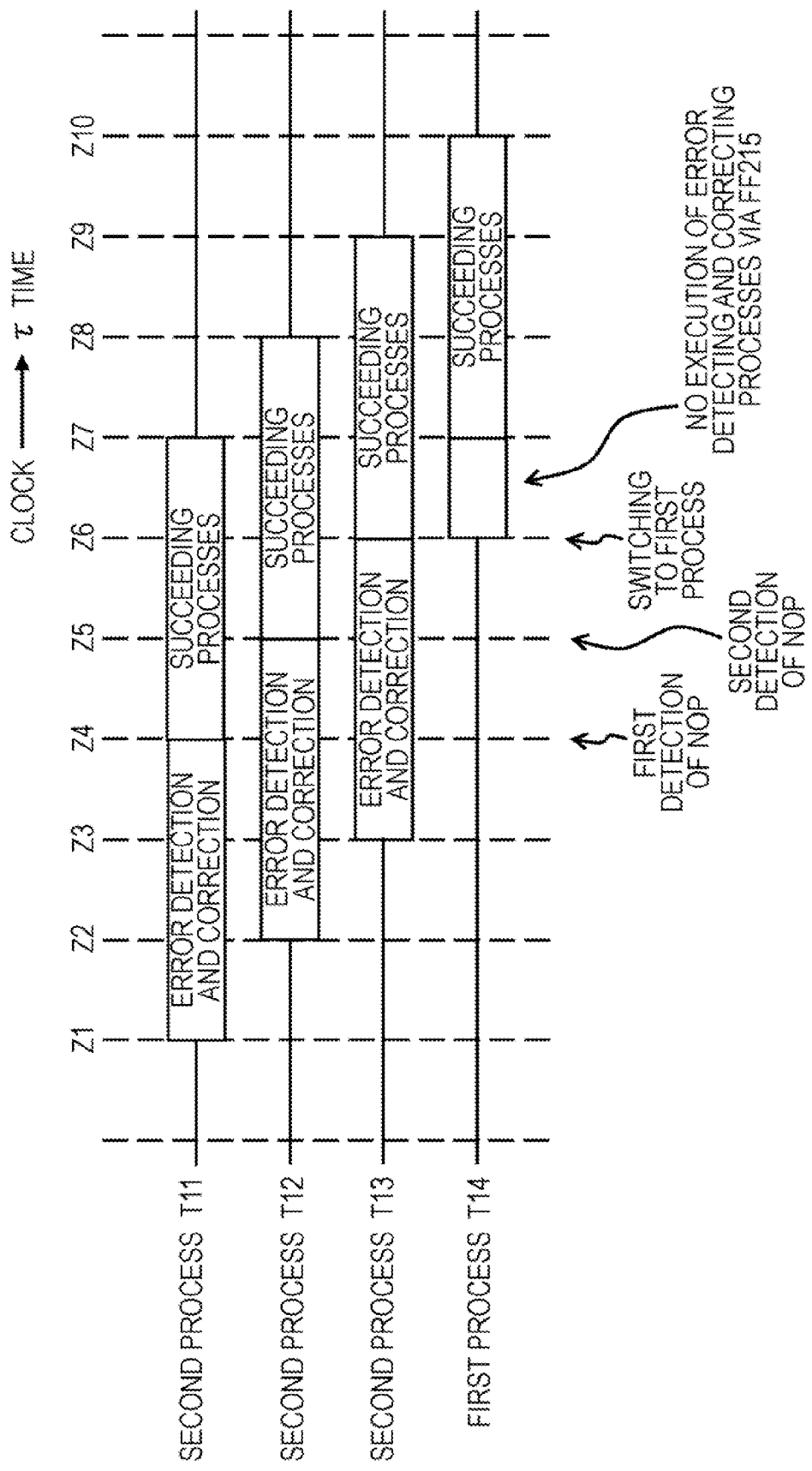
FIG. 6 is a diagram illustrating an example of a timing chart of the data processing circuit according to the embodiment.

FIG. 5 and FIG. 6 are respectively a flowchart and a timing chart illustrating an example of a state. The state indicates that the data processing in the second process T2 is executed until NOPs are successively detected using the process switch judging circuit 216 after the process to be executed has been switched from the first process T1 to the second process T2. Incidentally, in the case that a single bit error has been detected in the bit for control, the process switch judging circuit 216 stops execution of the first process T1 which is a preceding process and switches to data processing in the second process T2. The process switch judging circuit 216 operates to continue execution of the data processing in the second process T2 as long as the data is consecutively valid data in the process executed following the second process T2. Incidentally, the process switch judging circuit 216 has a function of returning the data processing which is being executed in the second process T2 to the data processing in the first process T1 in the case that invalid data such as an NOP or the like is detected and pieces of invalid data are successively detected.

FIG. 5 is a flowchart illustrating an example of an operation of the process switch judging circuit 216 according to the embodiment. That is, FIG. 5 illustrates an example of a flow of an operation that the process switch judging circuit 216 starts execution of a process of judging whether NOPs are detected in data that the data receive circuit 211 has received.

At S11, the process switch judging circuit 216 determines whether the multiplexer 214 outputs data on the first processing route. When it is determined that the multiplexer 214 does not output the data on the first processing route, the process switch judging circuit 216 executes the process at S12.

At S12, the process switch judging circuit 216 determines whether NOPs are successively detected in the data that the data receive circuit 211 has received for 2τ. In the case that the NOPs have been successively detected for 2τ (S12, Y), the process switch judging circuit 216 executes the process at S13.

At S13, the process switch judging circuit 216 instructs the multiplexer 214 to select the first processing route and output the data on the first processing route.

Incidentally, in the case that the multiplexer 214 is outputting the data on the first processing route (S11, Y) at S11, the process switch judging circuit 216 terminates execution of the process.

Likewise, in the case that the NOPs are not successively detected for 2τ (S12, N) at S12, the process switch judging circuit 216 terminates execution of the process.

FIG. 6 is a diagram illustrating an example of a timing chart of second processes T11 to T13 and a first process T14 that the data processing circuit 21A according to the embodiment executes. In FIG. 6, the horizontal axis indicates a time τ and each scale along the horizontal axis indicates one clock each. FIG. 6 illustrates a state in which pieces of data to be subjected to the second processes T11 to T13 and the first process T14 are sequentially transferred to the error detection and correction circuit 212 and processed therein.

Data to be subjected to the second process T11 is input from the data receive circuit 211 into the flip-flop 212A of the error detection and correction circuit 212 and the flip-flop 215 at a time Z1. The data which has been output from the flip-flop 212A is input into the flip-flop 212C via the gate circuit 212B of the error detection and correction circuit 212 at a time Z2. The data which has been output from the flip-flop 212C is input into the flip-flop 212E via the gate circuit 212D of the error detection and correction circuit 212 at a time Z3. Then, the error detecting and correcting processes are performed on the data using the error detection and correction circuit 212 for a time period from the time Z1 to a time Z4.

On the other hand, data which has been input from the data receive circuit 211 into the flip-flop 215 at the time Z1 is input into the multiplexer 214 at the time Z2. However, in the second process T11, the multiplexer 214 does not output the data which has been input into it via the flip-flop 215 and selects and outputs the data which has been send on the second processing route via the error detection and correction circuit 212.

Next, in the second process T11, the data which has been output from the flip-flop 212E of the error detection and correction circuit 212 is input into the flip-flop 218 via the multiplexer 214 and the parity generation circuit 217 at the time Z4. The data which has been output from the flip-flop 218 is input into the flip-flop 220 via the packet generation circuit 219 at a time Z5. The data which has been output from the flip-flop 220 is input into the flip-flop 223 via the error correction circuit 221 and the buffer memory 222 at a time Z6. Then, the succeeding processes are performed on the data using the parity generation circuit 217, the packet generation circuit 219 and the buffer memory 222 for a time period from the time Z4 to a time Z7.

Data which comes after the data subjected to the second process T11 and is to be subjected to the second process T12 is input into the flip-flop 212A of the error detection and correction circuit 212 at the time Z2. That is, in the second process T12, the data is input into the error detection and correction circuit 212 with a 1τ time delay from the time at which execution of the second process T11 is started. Then, the error detecting and correcting processes are performed on the data using the error detection and correction circuit 212 for a time period from the time Z2 to the time Z5. Then, the succeeding processes are performed on the data using the parity generation circuit 217, the packet generation circuit 219 and the buffer memory 222 for a time period from the time Z5 to the time Z8 in the second process T12.

Data which comes after the data subjected to the second process T12 and is to be subjected to the second process T13 is input into the flip-flop 212A of the error detection and correction circuit 212 at the time Z3. That is, in the second process T13, the data is input into the error detection and correction circuit 212 with a 1τ time delay from the time at which execution of the second process T12 is started. Then, the error detecting and correcting processes are performed on the data using the error detection and correction circuit 212 for a time period from the time Z3 to the time Z6. Then, the succeeding processes are performed on the data using the parity generation circuit 217, the packet generation circuit 219 and the buffer memory 222 for a time period from the time Z6 to a time Z9 in the second process T13. Incidentally, in each of the second processes T11 to T13, the multiplexer 214 selects and outputs the data which has been sent on the second processing route via the error detection and correction circuit 212.

It is assumed that the NOPs have been successively detected for 2τ using the process switch judging circuit 216 after the time Z3 at which execution of data processing in the second process T13 is started. For instance, it has been determined that the NOPs are successively present in the data which has been sent from the data receive circuit 211 for 2τ or more. The process switch judging circuit 216 then instructs the multiplexer 214 to stop execution of a process of outputting data which has been sent via the error detection and correction circuit 212 and to select and output the data which has been sent via the flip-flop 215. The multiplexer 214 performs a switching operation of selecting and outputting the data which has been sent on the first processing route in place of the data which has been sent on the second processing route in accordance with the instruction from the process switch judging circuit 216.

Data to be subjected to the first process T14 is input into the flip-flop 212A of the error detection and correction circuit 212 and the flip-flop 215 at the time Z6, that is, at a timing which comes after a timing at which the second NOP has been detected. The multiplexer 214 selects and outputs the data which has been sent from the flip-flop 215, that is, on the first processing route in accordance with the instruction from the error detection and correction circuit 212.

In the first process T14, the data which has been input into the flip-flop 215 is not subjected to the error detecting and correcting processes using the error detection and correction circuit 212 and is input into the flip-flop 218 via the multiplexer 214 and the parity generation circuit 217 at the time Z7. The data which has been output from the flip-flop 218 is input into the flip-flop 220 via the packet generation circuit 219 at the time Z8. The data which has been output from the flip-flop 220 is input into the flip-flop 223 via the error detection circuit 221 and the buffer memory 222 at the time Z9. Then, the succeeding processes are performed on the data using the parity generation circuit 217, the packet generation circuit 219 and the buffer memory 222 for a time period from the time Z7 to a time Z10.

In the case that the NOPs have been detected, for example, for 2τ or more, the process switch judging circuit 216 switches the process to be executed from the second process T13 to the first process T14 at a timing that 2τ has elapsed after detection of the first NOP. That is, the process switch judging circuit 216 switches the process to be executed from the second process T13 to the first process T14 in a time period from the time Z3 to the time Z6. The time Z3 is a time at which execution of data processing in the second process T13 is started. The time Z6 is a time at which execution of data processing in the first process T14 is started. That is, in data processing executed after the process to be executed has been switched to the first process T14, the first process T14 is continuously applied until a single error bit is detected in the bit for control using the error detection and correction circuit 212.

The error detection rate in each data processing executed using the error detecting circuit 21A was measured in order to verify a reduction in data processing time which is attained by the data processing circuit 21A according to the embodiment. The error detection rate at which the single bit errors have been detected was 0.1%. The error detection rate at which the single bit errors have been detected in the bit for control was 0.01% in the total number of single bit errors so detected. The error detection rate at which the double bit errors have been detected was 0.1%. The rate of the number of pieces of normal data with no error detection to the total number of pieces of data processed was 99.8%. That is, the above fact suggests that data with no error and data including single bit errors in the data body parts are present at the rate of 99.9%.

In the data processing circuit 21A according to the embodiment, the data processing may be executed on 99.9% of the data in the processing time taken for execution of the first process. The processing time $2\tau$ is the difference in processing time between the second process and the first process. Therefore, assuming that data processing has been executed, for example, one hundred times, the processing time $2\tau$ is saved every time the data processing is executed in the first process in comparison with a case in which only the second process is executed. Thus, the processing time reaching 99.8 (times)$\times 2\tau = 199.6\tau$ in total may be saved.

According to the technique disclosed therein, in the case that a single bit error is not detected in the bit for control using the error detection and correction circuit 212, the data which has been sent via the flip-flop 215 is output from the multiplexer 214. On the other hand, in the case that the single bit error has been detected in the bit for control using the error detection and correction circuit 212, the multiplexer 214 outputs the data in which the single bit error which is present in the bit for control has been corrected. The data in which the single bit error is not detected in the bit for control is output to the multiplexer 214 via the flip-flop 215 not passing through the error detection and correction circuit 212. Therefore, the time taken for the error detecting and correcting processes executed using the error detection and correction circuit 212 may be saved and hence the data processing time may be reduced.

Incidentally, the cluster 10 may include an I/O controller of the configuration which is the same as the configuration of the I/O controller 21 included in the system storage device 20. That is, the data processing circuit 21A according to the embodiment may be applied to the I/O controller included in the cluster 10. Application of the data processing circuit 21A to the I/O controller included in the cluster 10 may lead to a reduction in data processing time when data is sent from the cluster 10 to the system storage device 20.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment of the present invention has been described in detail, it should be understood that the various changes, substitutions, and alterations could be made hereto without departing from the spirit and scope of the invention.

What is claimed is:

1. A data processing circuit comprising:
   a receive circuit that receives data including a control bit for controlling a process of the data;
   a hold circuit that holds the received data and adjusts times at which an error is detected;
   an error detection circuit that detects the error in the received data;
   a first correction circuit that corrects the received data when the error of the control bit in the received data is detected, and outputs the corrected data; and
   an output select circuit that outputs data held in the hold circuit when no error is detected in the control bit, and outputs the corrected data outputted from the first correction circuit when the error is detected in the control bit.

2. The data processing circuit according to claim 1, wherein
   the first correction circuit outputs a first instruction for instructing the output select circuit to output the corrected data, and
   the output select circuit outputs the corrected data when receiving the first instruction from the first correction circuit.

3. The data processing circuit according to claim 1, wherein the output select circuit successively outputs data received from the first correction circuit when receiving a first instruction.

4. The data processing circuit according to claim 3, further comprising:
   an instruction circuit that determines whether the received data is operative or not, and outputs a second instruction for instructing the output select circuit to output data stored in the hold circuit when the received data is not operative.

5. The data processing circuit according to claim 1, further comprising: a second correction circuit that corrects the held data received from the hold circuit when the error of the held data is detected.

6. A data processing method performed by a data processing circuit, the data processing circuit including a receive circuit, a hold circuit, an error detection circuit and an output select circuit, the data processing method comprising:
   receiving data including a control bit used for controlling a process of the data;
   holding the received data in the hold circuit and adjusting times at which an error is detected;
   correcting the received data when the error of the control bit in the received data is detected;
   outputting the held data when the error of the control bit is not detected; and
   outputting the corrected data when the error is detected in the control bit.

7. The data processing method according to claim 6, wherein data received from a first correction circuit is successively outputted from the output select circuit when the error is detected in the control bit.

8. The data processing method according to claim 7, the data processing method further comprising:
   determining whether the received data is operative or not; and
   outputting data held in the hold circuit when it is determined that the received data is not operative.

9. The data processing method according to claim 6, the data processing method further comprising:
   correcting the held data when the error of the held data is detected; and
   outputting the corrected data corrected by a second correction circuit.

* * * * *